March 23, 1954　　　　R. SMITH　　　　2,672,952
TELESCOPIC HYDRAULIC SHOCK ABSORBER
Filed Nov. 14, 1949　　　　　　　　　3 Sheets-Sheet 1

Inventor,
RONALD SMITH
By
John James Victor Armstrong,
Attorney

March 23, 1954     R. SMITH     2,672,952
TELESCOPIC HYDRAULIC SHOCK ABSORBER
Filed Nov. 14, 1949     3 Sheets-Sheet 2

Inventor,
RONALD SMITH
By
John James Victor Armstrong,
Attorney

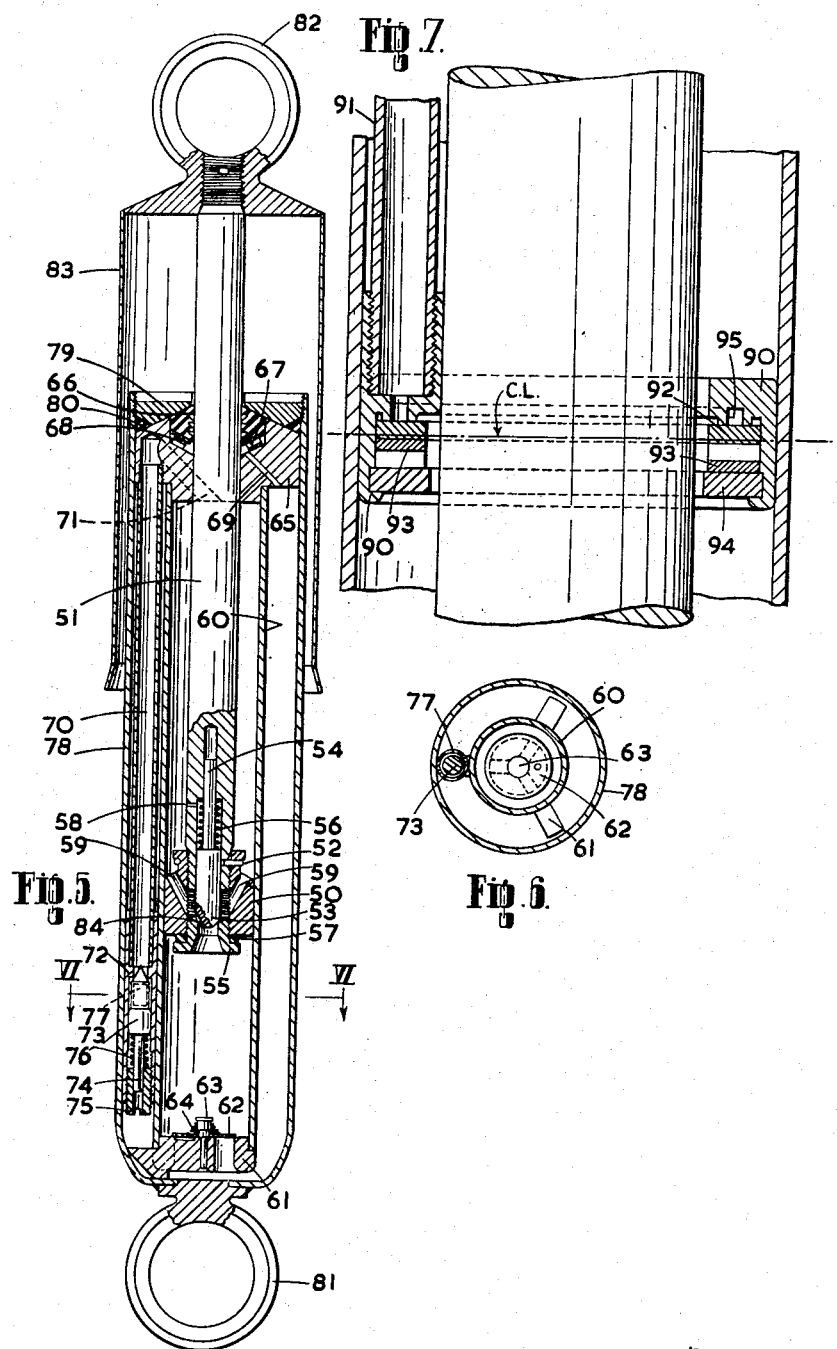

Patented Mar. 23, 1954

2,672,952

UNITED STATES PATENT OFFICE 2,672,952

TELESCOPIC HYDRAULIC SHOCK ABSORBER

Ronald Smith, Eastgate, Beverley, England, assignor to Armstrong's Patents Company Limited, Eastgate, Beverley, England, a British company Application November 14, 1949, Serial No. 126,943

Claims priority, application Great Britain November 20, 1948

2 Claims. (Cl. 188—88)

This invention concerns hydraulic shock absorbers of the so-called telescopic type, that is to say of the type wherein an attachment point for connection to one part of a vehicle is fixed to a piston and a second attachment point for connection to another part of the vehicle is fixed to a complementary cylinder so that control of relative movement between said parts of the vehicle may be effected in a direction axial of said piston and of said cylinder.

An object of this invention is to provide an hydraulic telescopic shock absorber of simple construction which may be produced at a relatively low cost.

According to the present invention a telescopic hydraulic shock absorber comprises, in combination, a pressure cylinder, a piston displaceable axially within said pressure cylinder, a liquid reservoir disposed externally to said pressure cylinder, two similarly directed non-return valves, one of which is a piston valve arranged to reciprocate within a counter bore in the connecting rod of the piston and the other of which is located at the bottom of the pressure cylinder, a bleed path from the counter bore in the piston rod to the interior of the pressure cylinder thereby oscillations of the valve in the piston are damped hydraulically, a passage extending between the top of the pressure cylinder and the top of the liquid reservoir, a dependent liquid discharge pipe extending from said passage to beneath the level of liquid in the reservoir, and a non-return valve assembly located at the lower end of the liquid discharge pipe and comprising a cylindrical element and a piston valve adapted to reciprocate within said cylindrical element and a bleed path located beneath said cylindrical element whereby oscillations of the said last named piston valve are damped hydraulically.

The invention will be described further by way of example with reference to the accompanying drawings, in which:

Fig. 1 is a vertical section,

Fig. 2 is a detail in vertical section on an enlarged scale showing the construction of the lower portion of the depending liquid discharge pipe illustrated in Fig. 1, Fig. 3 is a view similar to that of Fig. 2 but illustrating a modified valve arrangement at the lower end of the liquid discharge pipe, and Fig. 4 is a fragmentary vertical section of a telescopic shock absorber showing a modified valve arrangement at the lower end of the liquid discharge pipe and between upper and lower parts of the pressure cylinder, and by the accompanying drawings in which:

Fig. 5 is a vertical section,

Fig. 6 is a cross section on the line VI—VI of Fig. 5 of a modified telescopic shock absorber, and Fig. 7 is a detail in vertical section on an enlarged scale showing the construction of a modified valve assembly at the lower end of the depending liquid discharge pipe.

Figure 1:
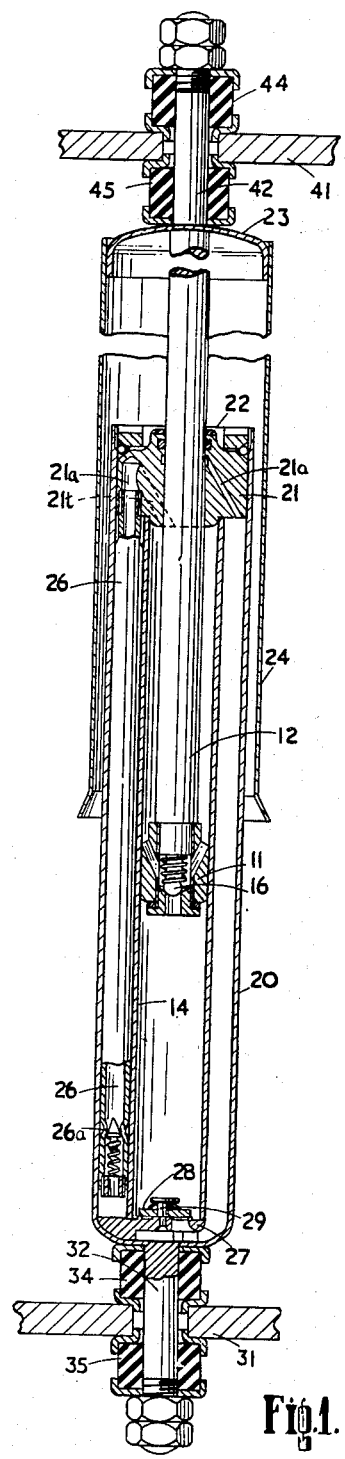

A telescopic shock absorber (Fig. 1) includes a piston 11 fixed to a connecting rod 12. The piston is displaceable in a pressure cylinder 14. The lower end of the cylinder 14 is closed by a base 27 including a spring steel valve disc 28, slidably mounted on a rivet 29 secured in an axial bore in the base 27, which acts as a valve body.

The upper end of the cylinder 14 is fixed to a cylinder head 21, which in turn is secured within, so as to close, the upper end of a tube 20 surrounding the cylinder 14. The cylinder and tube are so assembled that the base 27 is urged into contact with the closed lower end of the tube 20. Secured as by welding to the lower end of the tube 20 is a depending bolt 32, adapted to connect the tube 20 to a vehicle portion 31 by way of two rubber blocks 34 and 35. The upper end of the connecting rod 12 is attached by way of a dished end 23 to a bolt 42, which is similarly attached to another vehicle portion 41 by way of rubber blocks 44 and 45. A dust excluding cover 24 of tubular shape is attached, preferably by soft solder or spot welding to the flanged portion of the end 23.

The piston 11 includes a non-return valve assembly incorporating a valve 16. The cylinder head 21 is axially bored to allow passage therethrough of the connecting rod 12, which is sealed, preferably, as shown, by a washer or ring 22 located in a circumferential rebate in the wall of the axial bore, or by any other convenient sealing means.

Figure 2:
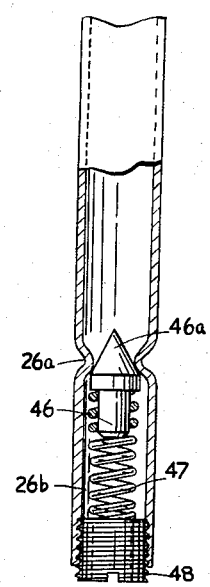

The cylinder head 21 includes an undercut groove, which is co-axial relative to the main bore, and said groove communicates by way of an oblique narrow bore 21a with an annular reservoir provided between the exterior of the cylinder 14 and the interior of the tube 20. This undercut groove and oblique bore is for the purpose of draining fluid which has leaked between the connecting rod 12 and the main axial bore in the cylinder head. There is also an oblique bore 21t providing communication between the interior of the upper end of the cylinder 14 and a bore 21u within which is threadedly engaged an upper reduced end portion of a depending liquid discharge pipe 26. The lower end portion of the pipe 26 is constricted at 26a (Figs. 1 and 2) to provide a shoulder on the lower side of the interior of the pipe so as to constitute a valve seat.

A displaceable valve member 46 having a conical valve head surface 46a is accommodated together with a coiled compression spring 47 within the lower end portion 26b of the pipe below the constriction thereof. A hollow plug 48, which may be threadedly engaged in the lowermost end portion of the pipe 26, serves as an abutment for the spring 47.

Figure 3:
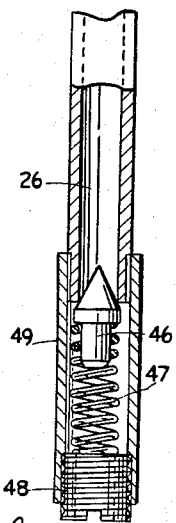

In an alternative construction the pipe 26 (Fig. 3) has engaged therewith a tube 49 of somewhat larger diameter, said tube accommodating the valve member 46, the spring 47 and plug 48, whilst the valve seat is presented by the inner periphery of the lower end of the pipe 26.

In operation the upper and lower portions of the cylinder 14 are completely filled with a suitable liquid such as oil, which is also introduced so as to partly fill the annular reservoir between the outside of the cylinder 14 and the inside of the tube 20. If the motion of the two parts of the vehicle is such that the piston is moved in a downward direction relative to the cylinder, the piston effects seating of the valve assembly, comprised by the spring steel valve disc 28 and a complementary annular seating presented by the base 27, whilst the valve 16 in the piston is unseated so as to allow liquid to pass upwardly through the piston 11. Due to the introduction of part of the piston rod into the cylinder there will be an excess or differential amount of oil which has to be displaced from the upper portion of the cylinder 14. This oil flows through the passage ways 21t and 21u, through the pipe 26 and the valve at the bottom of the pipe 26 is unseated. Such displaced liquid then passes into the annular reservoir. Production of foam is substantially avoided by admission below the level in said reservoir.

The restriction effect of the passages 21t and 21u, and of the pipe 26 and the valve assembly at the bottom thereof, depends upon the size of such passages or other components. Obviously, if a stronger spring is included in the valve assembly at the bottom of the pipe 26, the characteristics of the valve and the restriction effect upon the passage of liquid will be varied accordingly. The general characteristics of both upward and downward movement are initially obtained in the ratio selected between the piston rod and piston cross-sectional arrangements.

If movement between the vehicle parts is such as to cause upward movement of the piston 11 relative to the cylinder 14, such upward movement will cause an unseating of the valve assembly comprised by the spring steel valve disc 28 and the valve seat presented by the base 27, allowing liquid to pass from the reservoir into the lower portion of the cylinder 14. The valve 16 will, on the other hand, remain seated in the piston and due to the reduction in volume of the space in the cylinder above the piston, an excess of liquid will again be forced out by way of the passages in the cylinder head and the pipe 26. Thus, it will be appreciated that in whichever direction relative movement between the piston 11 and the cylinder 14 obtains, there will be a cyclical movement of liquid upwardly out of the cylinder through the cylinder head and into the reservoir.

On small relative movement of the piston or cylinder, fluid circulates between the cylinder and the reservoir through bleed holes or a metering device; for example, through a groove (46a) in the conical face of valve member 46.

It has been found that in certain circumstances the pressure relief valves, 16 and 46 are prone to produce noise, usually of a high frequency due to vibration of the valves. This vibration usually takes the form of longitudinal oscillation and consists of alternate seating and unseating of the valve. To eliminate this noise, sometimes referred to as valve "flutter," or to minimise the possibility of vibration occurring, a damped valve has been evolved in which the oscillations are damped hydraulically by the action of the hydraulic fluid medium operating in a small cylinder in which the valve is itself the piston. The flow of the liquid can occur through a small orifice, or, alternatively, between the piston and its cylinder. The resistance offered to this flow effects the damping, i. e. curtails the flutter.

Figure 8:
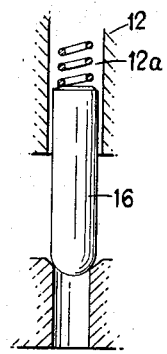
Fig. 8 is a detail on an enlarged scale of the piston valve assembly shown in Fig. 4.
Figure 4:
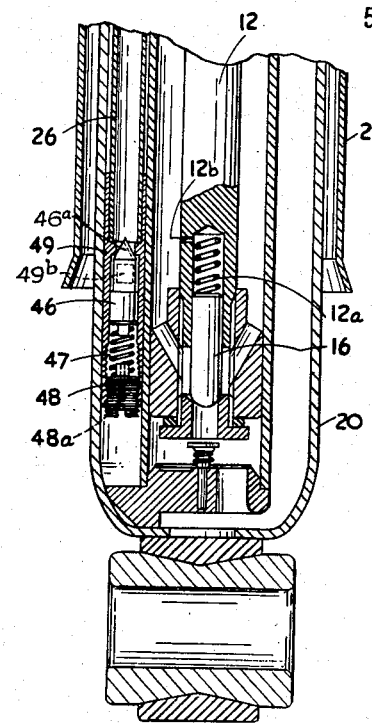

Referring, in particular, to Fig. 4, the lower end of the piston rod 12 is axially bored to provide a cylinder 12a within which a valve member 16 of generally cylindrical configuration is axially displaceable against the action of a small coil spring. The valve member 16 is slightly undersize (Fig. 8) so that the working fluid is able to pass between it and the cylinder 12a and hence to escape via bleed hole 12b. Similarly, the valve member 46 at the bottom of the liquid discharge passage 26 is arranged to reciprocate as a piston within the tube or cylinder 49, working fluid passing from the passage 26 into the reservoir through aperture 49b and via the bleed passage 48a in the plug 48. Communication between the cylinder 49 and the reservoir is afforded by means of a rectangular port as shown in dotted lines.

Figure 9:
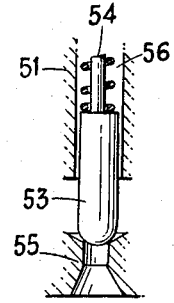
Fig. 9 is a detail on an enlarged scale of the piston valve assembly shown in Fig. 5.

In the further embodiment of the invention illustrated in Figs. 5 and 6, a telescopic shock absorber (Fig. 5) includes a piston 50 fixed to a piston rod 51 by screw thread, and locked in position thereon by means of a spring clip 52. Contained within the piston is a spherical ended, cylindrical non-return valve 53, which possesses an extension pin 54 of a reduced diameter. This valve is guided in two axially bored holes in that end of the piston rod which comes within the upper end of the piston. Screwed into the lower end of the piston is an annular screw 55, which forms a seat onto which the valve is urged under the pressure of a spring 56. A setting washer 57, of selected thickness, is interposed between the end of the piston and the head of the annular screw. It will be appreciated that according to the thickness of the setting washer, so will the spring load on the valve vary. In order that the valve will not flutter or vibrate when subjected to fluid pressure, its action is damped by means of the fluid itself, operating in the small cylinder in which the valve itself can be regarded as a piston. The flow of the fluid can occur through the small hole 58. Alternatively, the flow can occur via a small clearance between the valve and the cylinder (Fig. 9). It is the resistance which is offered to such flow which effects the damping on the valve. The flow of fluid through the piston itself from the underside to the upper side is effected by virtue of the pressure building up until it unseats the valve 53 and thence flows via the obliquely drilled ports 59.

The piston and rod are together displaceable in a pressure cylinder 60, to the lower end of which is fitted a non-return valve body 61. This is of spider formation for location purposes, and possesses three feet. Assembled to it is a spring steel disc 62, slidably mounted on a rivet 63 which is secured in an axial bore. The disc is urged onto its seat under the action of a conical coil spring 64, which thrusts against the under face of the rivet head.

The upper end of the pressure cylinder 60 is fitted with a cylinder head 65 having an axially bored hole which serves as a bearing bush for the piston rod. Contained within a suitable recess in the upper portion of the cylinder head is a rubber gland 66 having a series of internal lips, the object of which is to wipe off any fluid adhering to the piston rod. This gland is arranged to sit on a sympathetically shaped washer 67 which in turn sits on a waved annular spring 68. The object of the spring is to cause the gland, by virtue of its general external shape, to be compensated for any wear that takes place on the lips. The gland recess is opened up to the under surface of the cylinder head by means of an obliquely drilled hole 69 in order that any fluid that is wiped from the piston rod may drain out through it.

Fitted to the cylinder head by means of screw thread, and lying in line with, but outside the cylinder, is a depending tube 70. The bore of this tube is opened up to the interior of the cylinder via an obliquely drilled passage 71. Attached to the lower end of the depending tube by soldering, is a cylindrical valve chamber 72. Contained within this valve chamber is a conically headed valve 73 possessing an extension pin 74 which guides it inside a hollow screw 75. This valve also is so designed that it acts as a small piston working against a spring 76, inside a cylinder, thereby obviating flutter by virtue of the fluid damping. The valve chamber is cut away on two opposite sides to provide apertures 77 in order that the fluid being displaced from the pressure cylinder as a result of any upward displacement of the piston, may, on unseating the valve, escape into the reservoir formed by the tube 20. The ports formed by the cutaway 77 in the valve chamber also afford communication between the discharge pipe and the reservoir.

All the afore-mentioned parts, can, when assembled, be regarded as the internal unit. This is housed within a tube 78 having a bottled form at its lower end and a screw thread at its upper end. The spidered valve body serves as a location at the lower end (see Fig. 6) and the periphery of the cylinder head affords location at the upper end. The assembled internal unit is urged onto its three feet against the base of the tube by the tightening of a screwed nut 79, which is axially bored to allow clearance for the piston rod. The screwed nut and the engaging surface are so designed that an annular gap of triangular section is apparent between them and the inner periphery of the tube. Trapped or squeezed within this gap is a rubber sealing ring 80 the purpose of which is to prevent leakage of fluid from within the shock absorber.

Attached to the bottom face of the outer tube by welding or brazing is a ring forging 81 adapted to connect the tube to a vehicle portion.

Attached to the upper end of the piston rod by screw thread is a ring forging 82 likewise adapted to connect the piston rod to a vehicle portion. Spot welded onto the periphery of this forging is a tube of light section 83, the purpose of which is to protect the shock absorber from grit and small stones.

In operation, the upper and lower portions of the cylinder are completely filled with a suitable fluid preferably oil which is also introduced so as to partly fill the annular reservoir between the outside of the cylinder and the inside of the tube. If the motion of the two parts of the vehicle is such that the piston is moved downwards relative to the cylinder, the piston effects seating of the valve at the bottom of the cylinder. At the same time the valve in the piston is unseated thereby allowing oil to pass upwards through the piston. Due to the introduction of part of the piston rod into the cylinder there will be an excess or differential amount of oil which must be displaced through the oblique passage 71, through the depending tube 70 and the valve at the bottom of the depending tube is unseated. Such displaced oil then passes into the annular reservoir. Production of foam is minimised considerably by admission below the oil level in the reservoir. The restriction effect of the passages and ports and the valve assembly, depends upon the size of such passages and sizes of the component parts. If a stronger spring is included in the valve assembly at the bottom of the depending tube, the resistance to flow will vary accordingly. The general characteristics of both upward and downward resistances are initially obtained in the ratio selected between the piston rod and cylinder cross sectional arrangements.

If movement between the vehicle parts is such that the piston is moved upwards relative to the cylinder, the valve at the bottom of the cylinder is unseated, thus allowing oil to pass from the reservoir into the lower portion of the cylinder. The valve assembly in the piston will on the other hand remain seated and due to the reduction in volume of the space above the piston, an excess of oil will again be forced out through the oblique passage 71, through the depending tube and through the valve assembly at the bottom thereof. Thus it will be appreciated that whichever direction of relative movement obtains between the piston and the cylinder, there will be a cyclical movement of liquid upwardly out of the cylinder, through the depending tube and into the reservoir.

In the event of small relative movement, the oil is allowed to circulate between the cylinder and the reservoir through bleed holes or a metering device; for example, through a small groove 84 existing in the spherical end of the piston valve.

In the plate valve assembly illustrated in Fig. 7, the arrangement is in the form of a valve body 90 which is fixed by screwing (Fig. 7), to the lower end of a depending tube 91 inside the shock absorber.

Contained within the valve body 90 is an annular plate 92 which is urged against a seating face on the valve body by means of an annular waved spring 93. This spring thrusts against an annular thrust plate 94 which fits into the lower end of the valve body.

The complete valve is held together by rolling over of the lower periphery of the valve body, or alternatively by a screwed plug (not shown) which would make adjustable tension on the spring possible. Oil is directed into the annular groove 95 in the valve body via the tube 91. When the oil pressure reaches a certain desired value, the annular plate 92 is blown off its seat against the spring pressure caused by the spring 93 and the oil is allowed to exhaust into the external reservoir within the shock absorber.

The complete valve is positioned about half way up (Fig. 7 centre line. C. L.) the shock absorber so that it may serve a dual purpose by acting also as a baffle and thereby minimising any tendency for the oil to aerate inside the reservoir, and further, to prevent the oil reservoir being thrown bodily up the outer cylinder, by the motions of the anchorage.

I claim:

1. A telescopic hydraulic shock absorber comprising, in combination, a pressure cylinder, a piston displaceable axially within said pressure cylinder, a liquid reservoir disposed externally to said pressure cylinder, two similarly directed non-return valves, one of which is a piston valve arranged to reciprocate within a counter bore in the connecting rod of the piston and the other of which is located at the bottom of the pressure cylinder, a bleed path from the counter bore in the piston rod to the interior of the pressure cylinder whereby oscillations of the valve in the piston are damped hydraulically, a passage extending between the top of the pressure cylinder and the top of the liquid reservoir, a dependent liquid discharge pipe extending from said passage to beneath the level of liquid in the reservoir, and a non-return valve assembly located at the lower end of the liquid discharge pipe and comprising a cylindrical element, a piston valve adapted to reciprocate within said cylindrical element and a bleed path located at the lower end of said cylindrical element whereby oscillations of the said last-named piston valve are damped hydraulically.

2. A telescopic hydraulic shock absorber as claimed in claim 1, wherein the bleed path at the lower end of said cylindrical element is provided with a drilled plug closing the end of said cylindrical element.

RONALD SMITH.

References Cited in the file of this patent

UNITED STATES PATENTS

| Number | Name | Date |
|---|---|---|
| 1,164,371 | Lovejoy | Dec. 14, 1915 |
| 1,682,848 | Moody et al. | Sept. 4, 1928 |
| 2,048,285 | Padgett | July 21, 1936 |
| 2,062,816 | Mercer | Dec. 1, 1936 |
| 2,071,969 | Diescher | Feb. 23, 1937 |
| 2,085,581 | Green | June 29, 1937 |
| 2,107,974 | Bechereau et al. | Feb. 8, 1938 |
| 2,240,644 | Focht | May 6, 1941 |
| 2,309,499 | Chenault | Jan. 26, 1943 |
| 2,465,680 | Focht | Mar. 29, 1949 |

FOREIGN PATENTS

| Number | Country | Date |
|---|---|---|
| 351,426 | Italy | Aug. 11, 1937 |